United States Patent
Ahn et al.

(10) Patent No.: US 7,939,749 B2
(45) Date of Patent: May 10, 2011

(54) SOLAR CELL AND METHOD OF MANUFACTURING THE SAME

(75) Inventors: Kwang-Soon Ahn, Suwon-si (KR); Ji-Won Lee, Suwon-si (KR); Wha-Sup Lee, Suwon-si (KR); Jae-Man Choi, Suwon-si (KR); Byong-Cheol Shin, Suwon-si (KR); Joung-Won Park, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1231 days.

(21) Appl. No.: 11/137,534

(22) Filed: May 26, 2005

(65) Prior Publication Data
US 2005/0279402 A1  Dec. 22, 2005

(30) Foreign Application Priority Data
Jun. 3, 2004  (KR) .................. 10-2004-0040314

(51) Int. Cl.
*H01L 31/00* (2006.01)
(52) U.S. Cl. ........ 136/263; 136/256; 136/252; 438/437; 438/98; 428/432; 428/336; 428/702
(58) Field of Classification Search ............... 136/263, 136/256, 252; 438/437, 98; 428/432, 336, 428/702
See application file for complete search history.

(56) References Cited

U.S. PATENT DOCUMENTS

| | | | | |
|---|---|---|---|---|
| 5,221,854 A | * | 6/1993 | Banerjee et al. | 257/431 |
| 5,834,146 A | * | 11/1998 | Hoshizaki et al. | 430/58.5 |
| 5,891,264 A | * | 4/1999 | Shinohara et al. | 136/261 |
| 5,916,375 A | * | 6/1999 | Agui et al. | 136/258 |
| 6,132,881 A | * | 10/2000 | Hartig et al. | 428/432 |
| 6,154,311 A | * | 11/2000 | Simmons et al. | 359/359 |
| 6,169,246 B1 | * | 1/2001 | Wu et al. | 136/265 |
| 6,376,765 B1 | * | 4/2002 | Wariishi et al. | 136/263 |
| 6,602,606 B1 | * | 8/2003 | Fujisawa et al. | 428/432 |
| 6,653,701 B1 | * | 11/2003 | Yamazaki et al. | 257/414 |
| 6,683,244 B2 | * | 1/2004 | Fujimori et al. | 136/263 |
| 6,740,807 B2 | * | 5/2004 | Ono | 136/263 |
| 2002/0040728 A1 | * | 4/2002 | Yoshikawa | 136/263 |
| 2002/0197824 A1 | * | 12/2002 | Katsuragawa | 438/437 |
| 2003/0062082 A1 | | 4/2003 | Miteva et al. | |

(Continued)

FOREIGN PATENT DOCUMENTS

CN   1444291   9/2003

(Continued)

OTHER PUBLICATIONS

"Tin (II) Oxide", http://en.wikipedia.org/wiki/Tin(II)_oxide, accessed on Mar. 24, 2009.*

*Primary Examiner* — Alexa D Neckel
*Assistant Examiner* — Golam Mowla
(74) *Attorney, Agent, or Firm* — H.C. Park & Associates, PLC

(57) ABSTRACT

Provided is a solar cell including: a first electrode and a second electrode facing each other; a porous membrane interposed between the first electrode and the second electrode and having a dye adsorbed thereto; an electrolyte interposed between the first electrode and the second electrode; and a buffering layer interposed between the first electrode and the porous membrane and having at least two layers. According to the construction of the solar cell, an electron-hole recombination is prevented by preventing the contact between an electrode having a porous membrane and an electrolyte, thereby improving the electron collection property and the photoelectric conversion efficiency of the dye-sensitized solar cell.

29 Claims, 4 Drawing Sheets
(2 of 4 Drawing Sheet(s) Filed in Color)

U.S. PATENT DOCUMENTS

| | | | |
|---|---|---|---|
| 2004/0146720 A1* | 7/2004 | Ichiki et al. | 428/432 |
| 2004/0180218 A1* | 9/2004 | Nagashima et al. | 428/432 |
| 2005/0121070 A1* | 6/2005 | Fujisawa et al. | 136/256 |
| 2007/0026240 A1* | 2/2007 | Seto et al. | 428/432 |

FOREIGN PATENT DOCUMENTS

| | | |
|---|---|---|
| JP | 2003272724 | 9/2003 |
| JP | 200455536 | 2/2004 |
| JP | 2005141981 | 6/2005 |

* cited by examiner

SOLAR CELL AND METHOD OF MANUFACTURING THE SAME

BACKGROUND OF THE INVENTION

This application claims the benefit of Korean Patent Application No. 10-2004-0040314, filed on Jun. 3, 2004, in the Korean Intellectual Property Office, which is hereby incorporated by reference for all purposes as if fully set forth herein.

1. Field of the Invention

The present invention relates to a solar cell and a method of manufacturing the same, and more particularly, to a dye-sensitized solar cell using an electrochemical principle and a method of manufacturing the same.

2. Description of the Related Art

A dye-sensitized solar cell is a photoelectrochemical solar cell using an oxide semiconductor electrode including photosensitive dye molecules capable of absorbing visible rays to produce electron-hole pairs and titanium oxide which transfers the produced electrons.

FIG. 1 is a schematic diagram of a dye-sensitized solar cell. The dye-sensitized solar cell includes a first electrode 1, a second electrode 2, and a porous membrane 3 having dyes 5 adsorbed thereto and an electrolyte 4 wherein the porous membrane 3 and the electrolyte 4 are provided between the first electrode 1 and the second electrode 2.

In a conventional silicon solar cell, absorption of solar energy and production of an electromotive force by separating electron-hole pairs occur at the same time. Meanwhile, in the dye-sensitized solar cell, absorption of solar energy and transfer of charges occur at different times. Specifically, dyes absorb solar energy and a semiconductor transfers charges of the absorbed solar energy.

Referring to FIG. 1, photons from incident sunlight are absorbed by the dyes 5. The excited dyes then send electrons to the porous membrane 3, which is composed of transition metal oxide. The electrons migrate via the first electrode 1 to an external circuit to transfer electrical energy, and subsequently enter the second electrode 2 with an energy state lowered correspondingly with the energy lost during migration.

The resulting holes of the dyes 5 are supplemented with electrons from the electrolyte 4 as the electrolyte 4 accepts electrons from the second electrode 2.

Even though such a dye-sensitized solar cell can be inexpensively manufactured and is environmentally friendly and flexible compared to the conventional silicon solar cell, it is not practical because it has a low energy conversion efficiency.

In solar cells, the energy conversion efficiency, i.e., the photoelectric conversion efficiency, is proportional to the number of electrons produced by absorption of sunlight. Therefore, to increase the energy conversion efficiency, the number of electrons generated may be increased by increasing the amount of sunlight absorbed, increasing the amount of the dye adsorbed, or reducing/preventing a loss of the produced electrons due to the electron-hole recombination process.

To increase the amount of the dye absorbed per unit area, a method of preparing nanoparticles an oxide semiconductor has been developed. To increase the amount of sunlight absorbed, a method of increasing the reflectance of a platinum (Pt) electrode and a method of preparing oxide semiconductor particles mixed with oxide semiconductor light scattering particles having a size of several μm have been developed.

However, such conventional methods have poor photoelectric conversion efficiency. Thus, a new technology for improving the photoelectric conversion efficiency is needed.

Meanwhile, the dye-sensitized solar cell illustrated in FIG. 1 has interfaces or regions that deteriorate its characteristics, such as an absorption ability or ability to transfer of solar energy charges. Such interfaces include, for example, an interface between the transition metal oxide particles of the porous membrane 3 and the electrolyte 4 and an interface between the first electrode 1 to which the porous membrane 3 is applied and the electrolyte 4.

In the interface between the transition metal oxide particles of the porous membrane 3 and the electrolyte 4, the electrons transferred from the dyes 5 to the transition metal oxide particle react with oxide iodine ions in the electrolyte 4, which decreases the concentration of electrons to be transferred to the electrode 2, thereby deteriorating an open circuit voltage Voc, a short circuit current Isc, and a fill factor FF of the solar cell.

The interface between the first electrode 1 to which the porous membrane 3 is applied and the electrolyte 4 can affect a charge collection property, which is based on a recombination rate and a collection rate. The recombination rate is attributed to a reduction in the number of reactions between electrons in the first electrode 1 and oxide iodine ions in the electrolyte 4. Thus, it is very important to reduce the number of recombinations occurring in the interface and to increase the collection rate of electrons in the solar cell in order to improve the characteristics of the solar cell.

SUMMARY OF THE INVENTION

The present invention provides a dye-sensitized solar cell having an improved photoelectric conversion efficiency. According to an embodiment of the invention, there is provided a solar cell including a first electrode and a second electrode substantially parallel with each other, a porous membrane provided between the first electrode and the second electrode and having a dye adsorbed thereto, an electrolyte provided between the first electrode and the second electrode, a buffering layer interposed between the first electrode and the porous membrane and having at least two layers.

According to an embodiment of the invention, there is provided a method of manufacturing a solar cell, the method including preparing a first electrode and a second electrode, forming a buffering layer having at least two layers on a surface of the first electrode, forming a porous membrane on the buffering layer, adsorbing a dye in the porous membrane, disposing the second electrode on the porous membrane, filling an electrode in the space provided between the porous membrane and the second membrane; and sealing the first electrode and the second electrode.

It is to be understood that both the foregoing general description and the following detailed description are exemplary and explanatory and are intended to provide further explanation of the invention as claimed.

BRIEF DESCRIPTION OF THE DRAWINGS

The file of this patent contains at least one drawing executed in color. Copies of this patent with the color drawings will be provided by the U.S. Patent and Trademark Office upon request and payment of the necessary fees.

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

The present invention will now be described more fully with reference to the accompanying drawings, in which exemplary embodiments of the invention are shown.

Figure 1:
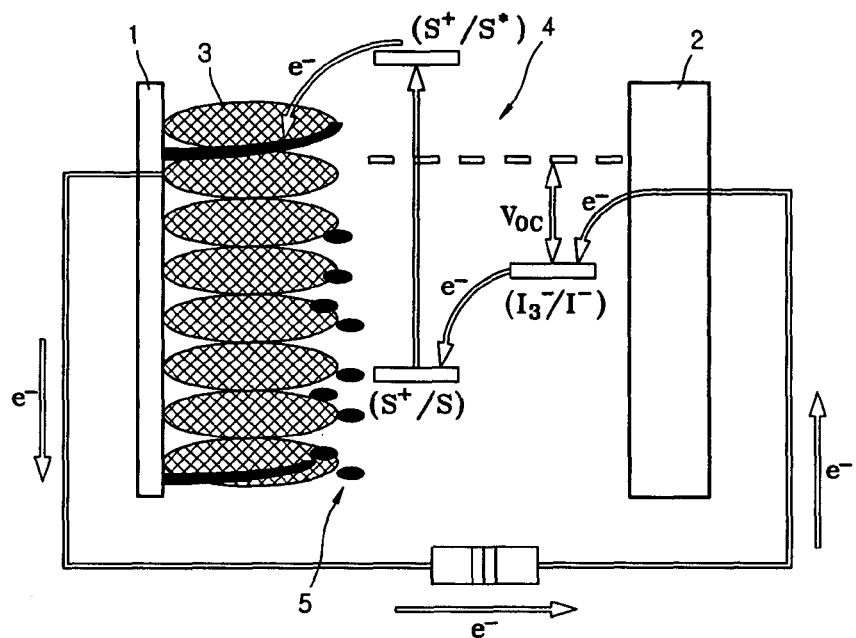
FIG. 1 is a schematic diagram of a conventional dye-sensitized solar cell.
Figure 2:
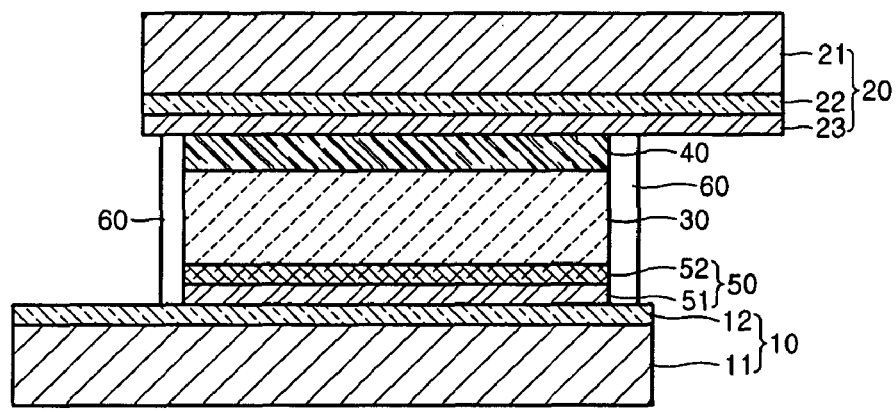
FIG. 2 is a schematic cross-sectional view of a dye-sensitized solar cell according to an embodiment of the invention.

FIG. 2 is a schematic cross-sectional view of a dye-sensitized solar cell according to an embodiment of the invention. Referring to FIG. 2, the dye-sensitized solar cell has a first electrode 10 and a second electrode 20 which are flat and substantially parallel with each other. A porous membrane 30 made of nanoparticles is applied to a surface of the first electrode 10. Photosensitive dyes having electrons that are excited due to an absorption of visible rays are absorbed to the surface of nanoparticles of the porous membrane 30.

The first electrode 10 and the second electrode 20 are joined by a supporting member 60 and an electrolyte 40 is provided in the space between the first electrode 10 and the second electrode 20 for oxidation and reduction of electrons. Although in FIG. 2, the electrolyte 40 is provided between the porous membrane 30 and the second electrode 20, this is only for explaining a manufacturing process and the present invention is not limited thereto. The electrolyte 40 may be provided in any space between the first electrode 10 and the second electrode 20.

The first electrode 10 is prepared by coating or applying a conducting film 12 having at least one of InSn oxide, In oxide, Sn oxide, Zn oxide, S oxide, F oxide, and a mixture thereof, on a substrate 11, such as a transparent plastic substrate, including PET, PEN, PC, PP, PI, TAC, or a glass substrate.

A buffering layer 50 having at least two layers is formed on a surface of the first electrode 10. The buffering layer 50 includes a first layer 51 formed of a material having a conduction band energy level that is lower than the conduction band energy of the porous membrane 30 and a second layer 52 having a conduction band energy level that is higher than the conduction band energy of the first layer 51. The first layer 51 and the second layer 52 have a particle size less than the particle size of the nanoparticles of the porous membrane 30, and thus have a structure more compact and less porous than the porous membrane 30 structure.

The first layer 51 reduces hole-electron recombination in the interface between the first electrode 10 and the electrolyte 40 to improve electron collection.

However, the interface between the buffering layer 50 and the porous membrane 30 may be adversely affected by thermal stress during the preparation process due to the buffering layer 50 and the porous membrane each having a different coefficient of thermal expansion.

To relieve the thermal stress in the buffering layer 50, the second layer 52 is provided between the first layer 51 and the porous membrane 30. Similar to the first layer 51, the second layer 52 is formed more compactly than the porous membrane 30 and operates as the buffering layer 50. The second layer 52 has a conduction band energy level that is higher than the conduction band energy level of the first layer 51 and is formed using the same material as the porous membrane 30 to relieve the thermal stress in the interface between the first layer 51 and the porous membrane 30 during the preparation process caused by changes in temperature. As a result, the adhesion force relating to the first electrode 10 and the porous membrane 30 is improved and there is no contact between the electrolyte 40 and the first electrode 10, which improves solar cell efficiency by preventing disconnection of the electrolyte 40 and the first electrode 10.

The first layer 51 of the buffering layer 50 may be made of at least one of W oxide, In oxide, Sn oxide, Zn oxide, SrTi oxide, FeTi oxide, MnTi oxide, BaTi oxide, and a mixture thereof.

The second layer 52 may be made of at least one of the following compounds: Ti oxide, W oxide, In oxide, Sn oxide, Zn oxide, SrTi oxide, FeTi oxide, MnTi oxide, BaTi oxide, and a mixture thereof.

The first layer 51 and the second layer 52 of the buffering layer 50 may be formed by any of several techniques capable of compactly forming each layer, such as sputtering, chemical vapor deposition (CVD), evaporation, thermal oxidation or electrochemical anodization (deposition). For example, the first layer 51 and the second layer 52 may be formed to a thickness of between 1 to 400 nm at a temperature of between room temperature to 400° C. by sputtering.

The porous membrane 30 deposited on a surface of the buffering layer 50 is made of transition metal oxide nanoparticles. The porous membrane 30 may include Ti oxide, Zr oxide, Sr oxide, Zn oxide, In oxide, Yr oxide, La oxide, V oxide, Mo oxide, W oxide, Sn oxide, Nb oxide, Mg oxide, Al oxide, Y oxide, Sc oxide, Sm oxide, Ga oxide and SrTi oxide alone or in combination.

A paste including the above transition metal oxide is coated on a or applied to surface of the buffering layer 50 and is heat treated to form the porous membrane 30. The physical properties required of the paste vary according to the coating method. For example, the paste is generally applied to the surface of the buffering layer 50 using a doctor blade or a screen printing method. For example, a spin coating or spray method is generally used to form a transparent layer on the surface of the buffering layer 50. General wet coating methods, including squeeze coating, may also be used to apply the paste to the surface of the buffering layer.

The heat treatment is performed at 450 and 600° C. for approximately 30 minutes when a inder is added and may be performed at 200° C. when a binder is not added.

To maintain the porosity of the porous membrane 30, a polymer may be added to the porous membrane 30 and the porous membrane 30 with the polymer is heat treated at a temperature of approximately 400 to 600° C. to obtain a coating with a high porosity. The polymer should not remain an organic material on the porous membrane 30 after the heat treatment.

The polymer added to the porous membrane 30 may include poly ethylene glycol (PEG), poly ethylene oxide (PEO), poly vinyl alcohol (PVA), poly vinyl pyridone (PVP), or the like. Among these polymers, a polymer is selected that has an appropriate molecular weight in consideration of coating conditions, such as a coating method. The addition of such polymer to the porous membrane 30 improves porosity, dispersion, film forming ability due to an increased viscosity, adhesion force, etc., of the porous membrane 30.

The porous membrane 30 includes nanoparticles that are uniformly distributed thereon. The porous membrane 30 should have a surface with a sufficient level of roughness while maintaining the porosity. For example, the nanoparticles have an average particle diameter of 100 nm or less, and preferably 10 to 40 nm, and a surface roughness of 20 nm or greater.

Upon investigating the photoelectric conversion efficiency according to a particle diameter of $TiO_2$ which is a representative material for the porous membrane 30, $TiO_2$ with a particle diameter less than 10 nm has a poor adhesion force enabling it to peel during a heat treating process of the formed film, whereas $TiO_2$ with a particle diameter greater than 40 nm produces a membrane with a small surface area, which reduces the amount of a dye adsorbed thereon, resulting in a poor photoelectric conversion efficiency. Thus, according to an embodiment of the invention, in consideration of both the processability and the efficiency of the porous membrane 30, the porous membrane 30 is formed using $TiO_2$ having a particle diameter of approximately 10 to 40 nm.

According to another embodiment of the invention, the porous membrane 30 includes conducting particulates, such as ITO, for facilitating migration of electrons, and/or light scattering particles for improving the photoelectric conversion efficiency by extending an optical path. For example, the light scattering particles may be made of the same material as the material for the porous membrane 30 and have an average particle diameter of 150 nm or greater.

The dyes adsorbed to the surface of nanoparticles of the porous membrane 30 are made of a material capable of absorbing visible rays including a Ruthenium (Ru) composite. Ru belongs to the platinum group and can form many organometallic composites.

Dyes of Ru(etc bpy)2(NCS)22CH3CN type are often used for solar cells. For example, (COOEt)2 or (COOH)2, each of which is a reactive group capable of binding to the porous membrane 30, for example, a $TiO_2$ surface, may be used as the dye surface. A dye having that is able to efficiently absorb visible rays with a long wavelength to improve the photoelectric conversion efficiency and a dye which easily releases electrons are currently being developed. Further a study for modifying the reactive group of the above described dye to prevent the electron-hole recombination is currently underway.

In addition, organic pigments of various colors are being considered as materials with high utilization possibility for improving the photoelectric conversion efficiency because of their relatively low costs and abundance. For example, organic pigments such as cuemarine, pheophorbide belonging to porphyrin, etc. may be used alone or in a combination with the Ru composite to improve an ability of the dye to absorb visible rays with a long wavelength, which improves the photoelectric conversion efficiency.

The dye is adsorbed into the porous membrane 30 by immersing the porous membrane 30 in a dye solution in an alcohol for approximately 12 hours.

The second electrode 20 includes a substrate 21, such as a transparent plastic substrate including, for example, PET, PEN, PC, PP, PI or TAC, or a glass substrate; a conducting film 22 coated on the substrate 21, the conducting film including at least one InSn oxide, In oxide, Sn oxide, Zn oxide, S oxide, F oxide and a mixture thereof; and a second conducting film 23 coated on the first conducting film 22, the second conducting film including Pt or another noble metal. A material with good reflectance properties is preferable, such as Pt.

The first electrode 10 and the second electrode 20 are joined by a supporting member 60, such as an adhesive film or a thermoplastic polymer film, such as SURLYN (available from Dupont™), which seals the space between the first electrode 10 and the second electrode 20. A micro hole (not shown) passing through the first electrode 10 and the second electrode 20 is then formed and an electrolyte solution is injected into the space between the two electrodes 10 and 20 through the micro hole. Subsequently, the micro hole is sealed or closed with an adhesive.

In addition to the supporting member 60, an adhesive, such as an epoxy resin or a UV curing agent, may be used to join together and seal the first electrode 10 and the second electrode 20. The adhesive may be cured after heat treatment or UV treatment.

Although the electrolyte 40 is shown as one layer in FIG. 2, the electrolyte 40 is uniformly dispersed in the porous membrane 30 between the first electrode 10 and the second electrode 20.

In a non-limiting example, the electrolyte 40 is an iodide/triodide pair that receives an electron from a counter electrode by oxidation and reduction and transfers the electron to the dye. The open circuit voltage Voc is determined by a difference between a fermi energy level of the porous membrane and an oxidation-reduction energy level of the electrolyte.

A method of manufacturing the dye-sensitized solar cell according to at least the above embodiment of the invention is described below in more detail.

A first electrode 10 and a second electrode 20, which are made of light transmitting materials, are prepared or formed. A first layer 51 is formed on a surface of the first electrode 10 and a second layer 52 may be formed thereon to form a buffering layer 50. A porous membrane 30 is then formed on the buffering layer 50. The methods of forming the buffering layer 50 and the porous membrane 30 may be the same as described above, therefore such methods are not described at this time.

A dye is then adsorbed in the porous membrane 30. A second electrode 20 is disposed on the porous membrane 30 and is positioned parallel with the first electrode 10, e.g., facing the first electrode 10. A space between the porous membrane 30 and the second electrode 20 is sealed by filling the space with the electrolyte 40 and the dye-sensitized solar cell is completed.

The present invention will now be described in greater detail with reference to the following examples. The following examples are for illustrative purposes only and are not intended to limit the scope of the invention.

EXAMPLE 1

According to an embodiment of the invention, a first layer 51 of W oxide with a thickness of 10 nm was deposited on a conducting film 12 made of ITO of a first electrode 10 using a RF magnetron sputtering equipment. The deposition conditions were W oxide as a sputtering target, 100 W, Ar atmosphere, an operating pressure of 10 mTorr, and room temperature.

A second layer 52 of Ti oxide was then deposited on the first layer 51 to a thickness of 15 nm. The deposition conditions of the second layer 52 were Ti oxide as a sputtering target, 300 W, Ar atmosphere, an operating pressure of 10 mTorr and room temperature.

A dispersion of Ti oxide particles with a particle diameter of approximately 5 to 15 nm was applied to an area of 1 $cm^2$ of the second layer 52 using a doctor blade and was sintered at 450° C. for 30 min to form a porous membrane 30 with a thickness of 10 μm.

Then, the resultant was let alone at 80° C. and was immersed in a 0.3 mM Ru(4,4'-dicarboxy-2,2'-bipyridine)$_2$ (NCS)$_2$ dye solution in ethanol for at least 12 hours. The dye adsorbed porous membrane 30 was then washed with ethanol and dried at room temperature.

A second conducting film 23 made of Pt was deposited on a first conducting film 22 composed of ITO by a sputtering technique to form a second electrode 20. A micro hole for injecting an electrolyte 40 was then formed in the second electrode 20 using a drill with a diameter of 0.75 mm.

A 60 μm thick supporting member 60 composed of a thermoplastic polymer film was placed between the first electrode 10 having the porous membrane 30 formed thereon and the second electrode 20 and was pressed at 100° C. for approximately 9 sec to join or connect the two electrodes.

An oxidation-reduction electrolyte 40 was then injected into the space provided between the two electrodes through the micro hole formed in the second electrode 20. The micro hole was then closed with a cover glass and a thermoplastic polymer film, which completed the formation of the dye-sensitized solar cell.

The used oxidation-reduction electrolyte 40 was a solution of 21.928 g of tetrapropylammonium iodide and 1.931 g of $I_2$ in a 4:1 mixture of ethylene carbonate and acetonitrile.

Figure 3:
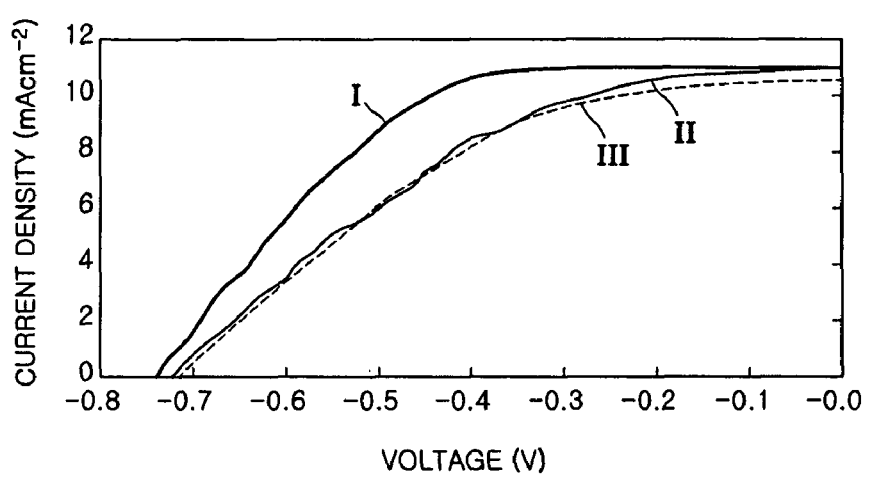
FIG. 3 illustrates photocurrent-voltage curves of the dye-sensitized solar cells according to Example 1 of the invention and Comparative Examples 1 and 2.

The efficiency, open circuit voltage Voc, short circuit current Isc, and fill factor FF of the solar cell manufactured in this way were evaluated through a photocurrent-voltage curve measured using a light source of 100 mW/cm$^2$ intensity and a Si standard cell. FIG. 3 illustrates the photocurrent-voltage curve I of the solar cell manufactured in Example 1, from which the efficiency of 4.46%, Voc of 0.74 V, Isc of 11 mA/cm$^2$ and FF of 0.55 were determined.

COMPARATIVE EXAMPLE 1

A solar cell was manufactured in the same manner as in Example 1, except that a porous membrane 30 was formed on the first layer 51 using a dispersion of Ti oxide particles.

FIG. 3 illustrates the photocurrent-voltage curve II of the solar cell, from which the efficiency of 3.39%, Voc of 0.72 V, Isc of 11 mA/cm$^2$ and FF of 0.43 were confirmed.

COMPARATIVE EXAMPLE 2

A solar cell was manufactured in the same manner as in Example 1, except that a porous membrane 30 was formed on a conducting film 12 of a first electrode 10 using a dispersion of Ti oxide particles.

FIG. 3 illustrates the photocurrent-voltage curve III of the solar cell, from which the efficiency of 3.27%, Voc of 0.71 V, Isc of 10.6 mA/cm$^2$ and FF of 0.44 were confirmed.

As can be seen from the results, a high efficiency dye-sensitized solar cell may be manufactured by using the multi-layered buffering layer.

Figure 4A:
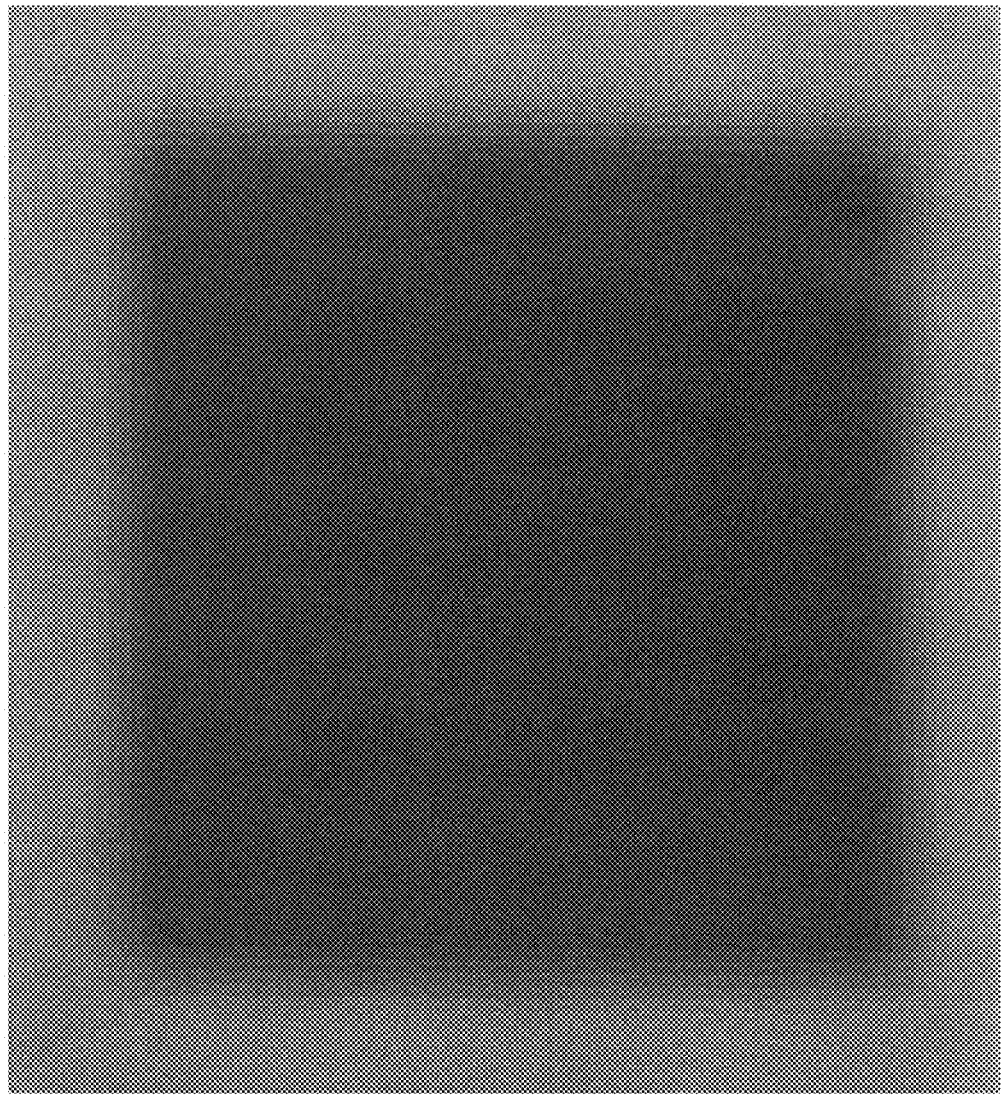
FIGS. 4A and 4B respectively are surface images of the porous membranes formed according to Example 1 of the invention and Comparative Example 1.
Figure 4B:
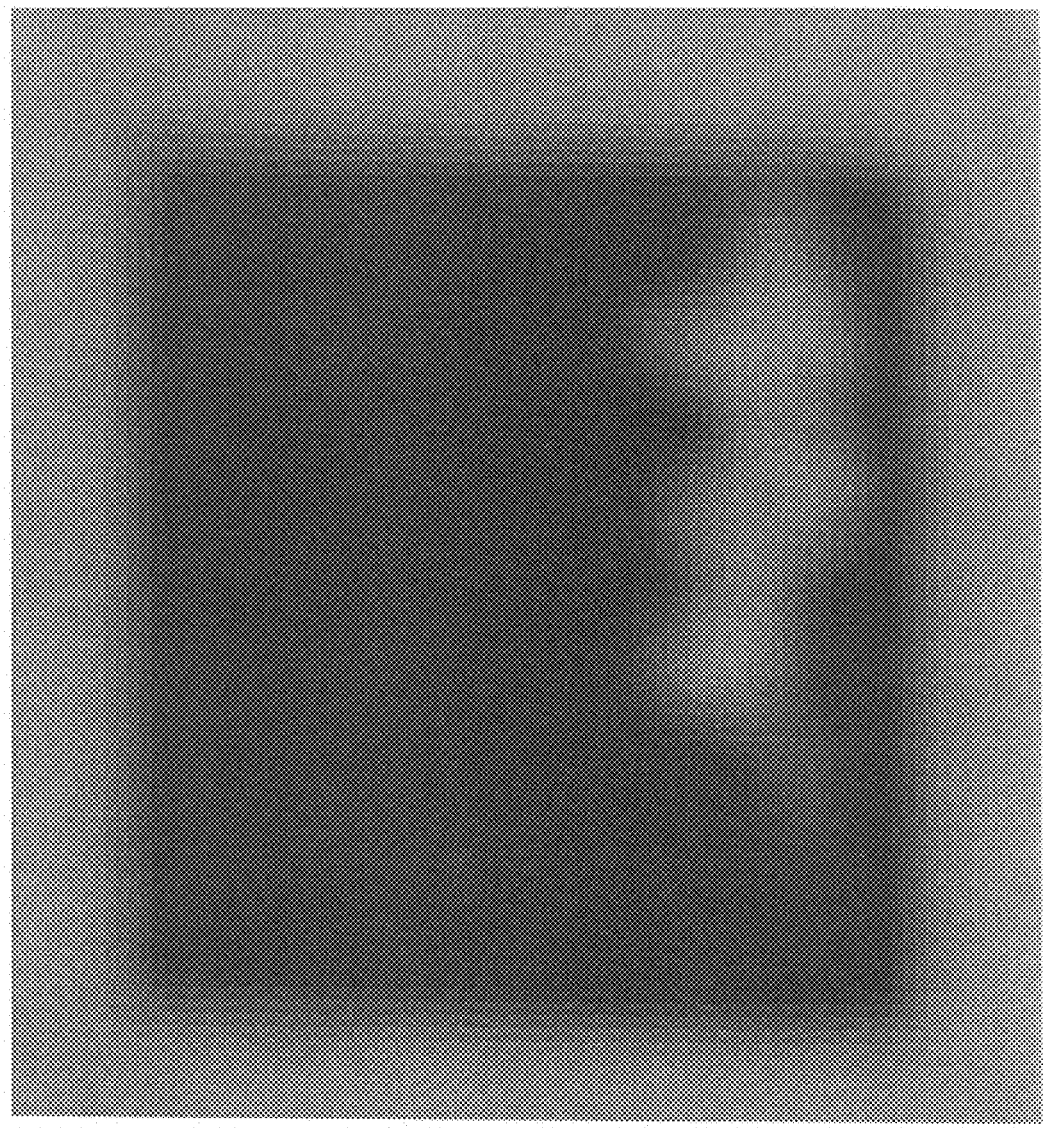

FIGS. 4A and 4B illustrate the surfaces of the porous membranes of Example 1 and Comparative Example 1. Such illustrations are used to determine whether there is any deterioration between the interface of the buffering layer 50 and the porous membrane 30.

Referring FIG. 4A, the porous membrane 30 of Example 1 was uniformly formed without deterioration of the interface between the buffering layer 50 and the porous membrane 30. However, referring to FIG. 4B, the interface between the buffering layer 50 and the porous membrane 30 of Comparative Example 1 was deteriorated during sintering at 450° C. due to a difference in the thermal expansion coefficient therebetween (Ti oxide: $3.76 \times 10^{-6}$/° C., W oxide: $8.19 \times 10^{-6}$/° C.), as shown by the light grey shaded region in the center-right portion of FIG. 4B.

As describe in the above embodiments of the present invention, the hole-electron recombination in the interface between a first electrode and an electrolyte is reduced when the first electrode is prevented from contacting an electrolyte, thereby obtaining an improved electron collection property.

Further, as described above, the thermal stress in the interface between a buffering layer and a porous membrane is relieved, which prevents deterioration of the interface therebetween.

Further, as described above, the adhesion force between the first electrode and the porous membrane is improved.

Further, as described above, contact between the electrolyte and the first electrode is prevented, which improves electron collection efficiency.

Therefore, according to the present invention, a high efficiency dye-sensitized solar cell may be manufactured with low costs.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A dye-sensitized solar cell, comprising:
   a first electrode and a second electrode substantially parallel with each other;
   a porous membrane provided between the first electrode and the second electrode and having a dye adsorbed thereto;
   an electrolyte provided between the first electrode and the second electrode; and
   a buffering layer interposed between the first electrode and the porous membrane and having at least a first layer and a second layer,
   wherein the first layer comprises a conduction band energy level that is less than a conduction band energy level of the porous membrane,
   wherein the second layer is provided between the first layer and the porous membrane and comprises a conduction band energy level that is higher than that the conduction band energy level of the first layer,
   wherein the first layer and the second layer have a particle size less than a particle size of the porous membrane, and
   wherein the first layer is arranged directly on the first electrode.

2. The solar cell of claim 1, wherein the porous membrane comprises nanoparticles of transition metal oxide.

3. The solar cell of claim 1, wherein the porous membrane comprises: Ti oxide, Zr oxide, Sr oxide, Zn oxide, In oxide, Yr oxide, La oxide, V oxide, Mo oxide, W oxide, Sn oxide, Nb oxide, Mg oxide, Al oxide, Y oxide, Sc oxide, Sm oxide, Ga oxide and/or SrTi oxide, alone or in a combination.

4. The solar cell of claim 2, wherein the nanoparticles of transition metal oxide have an average particle diameter of 100 nm or less.

5. The solar cell of claim 4, wherein the nanoparticles of transition metal oxide have an average particle diameter of approximately 10 to 40 nm.

6. The solar cell of claim 1, wherein the porous membrane further comprises conducting particulates and/or light scattering particles.

7. The solar cell of claim 1, wherein the first layer has a more compact structure than a structure of the porous membrane.

8. The solar cell of claim 1, wherein the first layer comprises at least one of W oxide, In oxide, Sn oxide, Zn oxide, SrTi oxide, FeTi oxide, MnTi oxide, BaTi oxide, and a mixture thereof.

9. The solar cell of claim 8, wherein the second layer comprises at least one of Ti oxide, W oxide, In oxide, Sn oxide, Zn oxide, SrTi oxide, FeTi oxide, MnTi oxide, BaTi oxide, and a mixture thereof.

10. The solar cell of claim 1, wherein the first electrode comprises at least one of InSn oxide, In oxide, Sn oxide, Zn oxide, S oxide, F oxide and a mixture thereof.

11. The solar cell of claim 1, wherein the second electrode comprises at least one of InSn oxide, In oxide, Sn oxide, Zn oxide, S oxide, F oxide and a mixture thereof.

12. The solar cell of claim 11, wherein the second electrode comprises Pt or a noble metal.

13. The solar cell of claim 2, wherein the dye is absorbed in the surface of the nanoparticles of transition metal oxide.

14. The solar cell of claim 1, wherein the dye comprises a material capable of absorbing visible rays that includes a Ru composite.

15. A method of manufacturing a solar cell, the method comprising:
preparing a first electrode and a second electrode;
forming a buffering layer having at least two layers on a surface of the first electrode;
forming a porous membrane on the buffering layer;
adsorbing a dye in the porous membrane;
disposing the second electrode on the porous membrane;
filling an electrolyte in a space provided between the porous membrane and the second electrode; and
sealing the first electrode and the second electrode,
wherein forming the buffering layer comprises:
forming a first layer having a conduction band energy level that is lower than a conduction band energy level of the porous membrane directly on a surface of the first electrode; and
forming a second layer having a conduction band energy level that is higher than the conduction band energy level of the first layer on a surface of the first layer, and
wherein the first layer and the second layer have a particle size less than a particle size of the porous membrane.

16. The method of claim 15, wherein the first layer has a more compact structure than a structure of the porous membrane.

17. The method of claim 15, wherein the second layer has a more compact structure than a structure of the porous membrane.

18. The method of claim 15, wherein the first layer comprises at least one of W oxide, In oxide, Sn oxide, Zn oxide, SrTi oxide, FeTi oxide, MnTi oxide, BaTi oxide, and a mixture thereof.

19. The method of claim 18, wherein the second layer comprises at least one of Ti oxide, W oxide, In oxide, Sn oxide, Zn oxide, SrTi oxide, FeTi oxide, MnTi oxide, BaTi oxide, and a mixture thereof.

20. The method of claim 15, wherein the buffering layer is formed by sputtering, chemical vapor deposition, evaporation, thermal oxidation, or electrochemical anodization.

21. The method of claim 15, wherein the buffering layer is deposited to a thickness of approximately 1 to 400 nm at a temperature of approximately room temperature to 400° C. by sputtering.

22. The method of claim 15, wherein the porous membrane is formed using nanoparticles of transition metal oxide.

23. The method of claim 15, wherein the porous membrane is formed by dispersing particles for forming the porous membrane on the buffering layer and drying the porous membrane having the dispersed particles.

24. The method of claim 15, wherein the porous membrane comprises Ti oxide, Zr oxide, Sr oxide, Zn oxide, In oxide, Yr oxide, La oxide, V oxide, Mo oxide, W oxide, Sn oxide, Nb oxide, Mg oxide, Al oxide, Y oxide, Sc oxide, Sm oxide, Ga oxide and SrTi oxide, alone or in a combination.

25. The method of claim 23, wherein the forming of the porous membrane further comprises adding any one of conducting particulates to the particles dispersed on the buffering layer, adding light scattering particles with an average particle diameter of 150 nm or greater to particles dispersed on the buffering layer, or adding both the conducting particulates and the light scattering particles to the particles dispersed on the buffering layer.

26. The method of claim 22, wherein the dye is adsorbed in the surface of the nanoparticles of transition metal oxide.

27. The method of claim 15, wherein the adsorbing of the dye comprises adding a material capable of absorbing visible rays that includes a Ru composite to the dye.

28. The method of claim 15, wherein the first electrode is prepared by applying a conducting film on a transparent plastic substrate, wherein the conducting film includes at least one of InSn oxide, In oxide, Sn oxide, Zn oxide, S oxide, F oxide, and a mixture thereof, and wherein the transparent plastic substrate includes PET, PEN, PC, PP, PI or TAC, or a glass substrate.

29. The method of claim 15, wherein the second electrode is prepared by applying a first conducting film on a transparent plastic substrate and coating a second conducting film on the first conducting film, wherein coating a first conducting film including at lease one selected from the group consisting of InSn oxide, In oxide, Sn oxide, Zn oxide, S oxide, F oxide and a mixture thereof, wherein the transparent plastic substrate includes PET, PEN, PC, PP, PI or TAC, or a glass substrate, and wherein the second conducting film includes Pt or a noble metal.

* * * * *